United States Patent Office 2,962,482
Patented Nov. 29, 1960

2,962,482
PROCESS FOR BROMINATING COPOLYMERS

Delmer L. Cottle, Highland Park, Leon S. Minckler, Jr., Metuchen, and Theodore Lemiszka, Roselle, N.J., assignors to Esso Research and Engineering Company, a corporation of Delaware No Drawing. Filed Apr. 2, 1958, Ser. No. 725,777

10 Claims. (Cl. 260—85.3)

This invention relates to the preparation of brominated rubbery copolymers of isoolefins and multiolefins, particularly brominated butyl rubber produced in the presence of gaseous chlorine.

It is known that butyl rubber may be improved as to heat aging resistance, covulcanizability and adhesion to other rubbery polymers by brominating the same so as to contain not more than 3 (and preferably not more than 1) combined atoms of bromine per double bond in the polymer. However, although under theoretical conditions, for each mole of bromine added one atom combines with the rubbery butyl copolymer, in practice the bromination process is only about 50 to 70% efficient.

In accordance with the present invention, it has now been found that the bromination of butyl rubber may be run at about 90 to 100% efficiency provided the bromination is conducted in a closed reactor and that after reaction for a substantial period of time with bromine or a brominating agent, there is then added to the system not more than about 1 mole of gaseous chlorine for each mole of bromine and a second substantial halogenation period permitted in which additional bromine combines with the copolymer in the presence of the chlorine gas. In general about 0.2 to 1.0 mole of chlorine is added per mole of bromine added to the reaction mixture, the two halogenation time periods preferably varying with the halogenation temperature for between about 3 and 90 minutes each.

Butyl rubber copolymers comprise a major proportion (preferably about 85 to 99.5 weight percent) of a $C_4$ to $C_8$ isoolefin such as isobutylene, 2-methyl-1-butene or 3-methyl-1-butene, etc., with a minor proportion (preferably about 15 to 0.5 weight percent) of a multiolefin of about 4 to 14, preferably of about 4 to 6 carbon atoms and are commonly referred to in patents and technical literature as "butyl rubber," or GR-I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, myrcene, dimethallyl, allo-ocymene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methylstyrene, alpha-methylstyrene, indene, dihydronaphthalene, dichlorostyrene, p-chlorostyrene, mixtures thereof, etc. Such a copolymer has a Staudinger molecular weight between about 20,000 and 300,000, or a viscosity average molecular weight of about 250,000 to 2,000,000 and an iodine number between about 0.5 and 50, preferably about 1 to 20.

The modified rubbery isoolefin-multiolefin copolymers of the present invention are produced by carefully brominating these copolymers first in the absence and then in the presence of gaseous chlorine. The bromination is regulated so that the resulting modified rubber will contain at least about 0.5 weight percent (preferably at least about 1.0 weight percent) combined bromine but not more than about 3.0 "X" weight percent (preferably not more than about "X" weight percent) combined bromine wherein:

$$X = \frac{M_3 L}{(100-L)M_1 + L(M_2+M_3)} \times 100$$

and:

$L$=mole percent of the multiolefin in the polymer,
$M_1$=molecular weight of the isoolefin,
$M_2$=molecular weight of the multiolefin,
$M_3$=atomic weight of bromine.

The modified copolymer formed generally contains about 0.5 to 10 weight percent bromine and preferably about 1.0 to 8.0 weight percent combined bromine.

Suitable brominating agents which may be employed are liquid bromine, alkali metal hypobromites, sulfur bromides (particularly sulfuryl bromide) and pyridinium bromide perbromide or the like.

The modification reaction is generally conducted at temperatures of above about 0° to about +200° C., preferably at about 20° to 150° C. (depending upon the bromination temperature used, and the particular bromination agent) for a time of about 0.05 to 50 hours, although this time is not always especially critical. Total bromination times of about 0.1 to 3.0 hours are preferred, the chlorine gas being generally added to about the midpoint of the bromination process, although about ⅛ to ⅞ of the bromination process may be complete before chlorine addition. An advantageous pressure range is from about 0.5 to 400 p.s.i.a., atmospheric pressure being satisfactory. The modification reaction may be accomplished preferably by preparing a 1 to 80 weight percent solution of such copolymers as above, in a substantially inert liquid organic solvent such as a $C_5$ to $C_{10}$ substantially inert hydrocarbon, e.g., hexane, mineral spirits, cyclohexane, benzene, chlorobenzene, mixtures thereof, etc., and adding thereto the brominating agent followed by gaseous chlorine as outlined above.

The resulting modified isoolefin-multiolefin-containing copolymer may be recovered by precipitation with oxygenated hydrocarbons, particularly alcohols or ketones such as acetone or any other known non-solvent for the rubbery copolymer and dried under about 0.1 to 760 millimeters or higher of mercury pressure absolute at about 0° to 180° C., preferably about 50° to 150° C. (e.g., 70° C.). Other methods of recovering the modified polymer are by conventional spray or drum drying techniques. Alternatively, the solution of modified butyl rubber may be injected into a vessel containing steam and/or agitated water heated to a temperature sufficient to volatilize the solvent and form an aqueous slurry of the modified butyl rubber. This modified butyl rubber may then be separated from the slurry by filtration and drying and recovered as a "crumb" or as a dense sheet or slab by conventional hot milling and/or extruding procedures. As so produced the modified rubbery copolymer has a Staudinger molecular weight within the range of approximately 20,000 to 300,000, preferably about 25,000 to 200,000.

In order to more fully illustrate the present invention, the following experimental data are given.

*Example*

100 parts by weight of an isobutylene-isoprene butyl rubber copolymer having an intrinsic viscosity of 1.44 and a mole percent unsaturation of 1.8 were dissolved in an aluminum-chloride treated narrow cut hexane fraction to a concentration of 12.8 weight percent and then brominated with 2.50 weight percent added liquid bromine, both in the absence and presence of 1.25 weight percent of subsequently added gaseous chlorine. The reaction was at room temperature for 60 minutes in both cases. In the run in the subsequent presence of gaseous chlorine, the first bromination period was 32 minutes in the absence of chlorine followed by a bromination period of 28 minutes in the presence of gaseous chlorine. The results were as follows:

|  | Run A | Run B |
|---|---|---|
| Weight percent of $Br_2$ added first | 2.50 | 2.50 |
| Weight percent of $Cl_2$ added second | 0.00 | 1.25 |
| Weight percent of bromine combined in product | 0.83 | 1.23 |
| Percent efficiency of bromination | 66 | 98 |

The above data show that the subsequent addition of gaseous chlorine during approximately the mid-point of bromination raises the bromination efficiency from 66% to 98%.

Resort may be had to modifications and variations of the disclosed embodiments without departing from the spirit of the invention or the scope of the appended claims.

What is claimed is:

1. In a process for brominating a butyl rubber which is a coplymer of a major proportion of a $C_4$ to $C_8$ isoolefin and a minor proportion of a $C_4$ to $C_{14}$ multiolefin so as to contain at least about 0.5 weight percent combined bromine but not more than about 3 atoms of combined bromine per double bond in the copolymer, the improvement which comprises adding 0.2 to 1 mol of gaseous chlorine per mole of added bromine to the reaction mixture after the bromination reaction is only partially complete and finishing up the bromination in the presence of the chlorine gas.

2. A process according to claim 1 in which the bromination temperature is between about 0° and 200° C.

3. A process according to claim 1 in which the chlorine is added to the reaction mixture after brominating for about 0.3 minute to 50 hours followed by brominating in the presence of chlorine gas for about 0.05 minute to 50 hours.

4. A process according to claim 1 in which there is added about 1 mole of gaseous chlorine per mole of added brominating agent.

5. A process according to claim 1 in which at least 45 weight percent of the available bromine for bromination is combined with the butyl rubber copolymer corresponding to a bromination efficiency of at least about 90%.

6. In a process for brominating an isoolefin-multiolefin butyl rubber which is a copolymer of a major proportion of a $C_4$ to $C_8$ isoolefin and a minor proportion of a $C_4$ to $C_{14}$ multiolefin so as to contain at least about 0.5 weight percent combined bromine but not more than about 1 atom of combined bromine per double bond in the copolymer, the improvement which comprises adding 0.2 to 1 mol of gaseous chlorine per mole of added bromine to the reaction mixture after the bromination reaction is about ¼ to ¾ complete and finishing up the bromination in the presence of the chlorine gas.

7. A process according to claim 6 in which the bromination temperature is between about 20° and 150° C.

8. A process according to claim 6 in which the chlorine is added to the reaction mixture after brominating for about 0.05 to 1.5 hours followed by brominating in the presence of chlorine gas for about 0.05 to 1.5 hours.

9. A process according to claim 6 in which there is added about 1 mole of gaseous chlorine per mole of added brominating agent.

10. A process according to claim 6 in which an amount of at least about 47.5 weight percent of the available bromine for bromination is combined with the butyl rubber coplymer, said amount corresponding to a bromination efficiency of at least about 95%.

References Cited in the file of this patent

UNITED STATES PATENTS

| 2,631,984 | Crawford et al. | Mar. 17, 1953 |
| 2,698,041 | Morrissey et al. | Dec. 28, 1954 |
| 2,716,140 | McBee et al. | Aug. 23, 1955 |
| 2,720,479 | Crawford et al. | Oct. 11, 1955 |
| 2,809,372 | Frederick et al. | Oct. 8, 1957 |
| 2,816,098 | Morrissey | Dec. 10, 1957 |
| 2,833,734 | Morrissey et al. | May 6, 1958 |

OTHER REFERENCES

Sconce et al.: Unit Processes in Organic Synthesis, 5th edition, page 205 (1958).